United States Patent

Rabitz et al.

[11] Patent Number: 6,153,149
[45] Date of Patent: Nov. 28, 2000

[54] ADAPTIVE FEEDBACK CONTROL FLOW REACTOR

[75] Inventors: Herschel A. Rabitz, Lawrenceville; Christodoulos A. Floudas, Princeton, both of N.J.; Richard A. Yetter, Yardley, Pa.

[73] Assignee: The Trustees of Princeton University, Princeton, N.J.

[21] Appl. No.: 08/906,756

[22] Filed: Aug. 6, 1997

[51] Int. Cl.[7] ............................. G05D 11/00; G01N 31/00
[52] U.S. Cl. ..................... 422/108; 422/109; 422/110; 422/111; 422/62; 422/198; 422/194; 700/268; 700/274; 700/266
[58] Field of Search ..................... 422/108, 107, 422/109, 111, 105, 119, 189, 62, 138, 194, 199, 186.22; 700/274, 266, 268, 269; 435/3, 286.1; 436/55

[56] References Cited

U.S. PATENT DOCUMENTS

| | | | |
|---|---|---|---|
| 3,576,606 | 4/1971 | DeVry | 422/189 |
| 4,008,049 | 2/1977 | Clemmer et al. | 422/111 |
| 4,213,939 | 7/1980 | Ruble | 422/151 |
| 4,269,805 | 5/1981 | Schoengen et al. | 422/106 |
| 4,361,538 | 11/1982 | Dicoi et al. | 422/62 |
| 4,668,473 | 5/1987 | Agarwal | 422/62 |
| 5,065,336 | 11/1991 | Buchelli | 364/499 |
| 5,521,814 | 5/1996 | Teran et al. | 364/402 |

OTHER PUBLICATIONS

Zahradnik et al., *Ind. Eng. Chem. Fundam.*, 10(1), 176–179 (1971).
Rojnuckarin et al., *Ind. Eng. Chem. Res.*, 35(3), 683–696 (1996).
Rojnuckarin et al., *J. Phys. Chem*, 97(45), 11689–11695 (1993).
Jacoby, "New Reactor Boosts Yield, Reduces Waste", *C&EN*, 51, (Apr. 7, 1997).

*Primary Examiner*—Marian C. Knode
*Assistant Examiner*—Susan Ohorodnik
*Attorney, Agent, or Firm*—Synnestvedt & Lechner LLP

[57] ABSTRACT

A flow reactor providing a high degree of selectivity in the reaction of a feedstock to produce one or more end product compounds, which includes: side walls defining an elongated reactor unit having a length dimension along which the feedstock is reacted under varying conditions of energy and chemical flux effective to produce the one or more end product compounds; a plurality of devices for supplying energy or chemical flux through the side walls and positioned to distribute the energy and chemical flux along the length of the reactor unit so as to optimize a property of the one or more end product compounds; devices for measuring a property of the end product compounds; and an adaptive feedback control system to determine, establish and maintain the optimum energy and chemical flux distribution along the length of the reactor based on the end product property measurement.

31 Claims, 4 Drawing Sheets

ADAPTIVE FEEDBACK CONTROL FLOW REACTOR

BACKGROUND OF THE INVENTION

The present invention relates to flow reactors having a high degree of selectivity in the reaction of a feedstock to produce one or more end product compounds. In particular, the present invention relates to flow reactors adapted to supply energy or chemical flux through the reactor side walls to distribute the energy or chemical flux along the length of the reactor unit so as to optimize a property of the one or more end product compounds, such as the yield relative to one or more competing byproducts. The present invention also relates to methods for obtaining a high degree of selectivity in the reaction of a feedstock to produce one or more end product compounds in a flow reactor.

Flow reactors are widely used in various kinds of chemical processes. For high-value products, maximum yields are of primary concern, and the determination of the optimum flux profiles for the reactor is even more important. Prior art processes have attempted to optimize yields through control of the reactor feedstock entering the input end of the reactor. However, the best yield for a reactor is usually difficult to obtain in this manner, especially if the system under consideration is highly nonlinear or very ill-conditioned.

For example, previous approaches to methane upgrading via oxidative coupling have shown that the highest selectivity to ethylene formation is obtained at low conversion efficiency. This problem, which prevents high conversion efficiencies and thus makes the process more costly, results from the fact that the desired end products of the reaction are more reactive than methane. Once the end product concentrations build up appreciably, competition with the original methane feed occurs, and the end products begin to be consumed in competing reactions to form undesired byproducts at a rate faster than the original methane feed is being converted to the desired end products. Under this single-stage mode of operation, a typical conversion efficiency for maximizing ethylene yield is approximately ten percent.

A flow reactor having a flux profile optimally controlled to produce end products at commercially feasible yields would be highly desirable.

SUMMARY OF THE INVENTION

This need is met by the present invention. It has now been discovered that the energy and chemical flux distribution along the length of a flow reactor can be optimized to maximize end product yield and at the same time minimize the yields of undesirable byproducts by supplying the energy or chemical flux through the reactor side walls to establish and maintain the optimum flux profile. Through a system of adaptive feedback control employing an iterative multi-variant analysis of the competing chemical reactions in the reactor for a plurality of energy and chemical flux distributions, it is possible to determine the optimum chemical and energy flux profile that will maximize end product yield and at the same time minimize the yield of undesired byproducts, and then supply predetermined quantities of energy or chemical flux through the reactor side walls at predetermined locations along the length of the reactor, wherein the quantity of flux and location at which it is delivered is effective to establish and maintain the optimum chemical and energy flux profile.

Therefore, according to one aspect of the present invention, a flow reactor is provided in which it is possible to attain a high degree of selectivity in the reaction of a feedstock to produce one or more end product compounds, which flow reactor includes:

side walls defining an elongated reactor unit having a length dimension along which the feedstock is reacted under varying conditions of energy and chemical flux effective to produce the end product; and a plurality of devices for supplying energy or chemical flux through the side walls and positioned to distribute the energy or chemical flux along the length of the reactor unit so as to optimize a property of the one or more end product compounds relative to the property of the end product compounds when the feedstock is reacted without the introduction of energy or chemical flux through the reactor side walls.

In a preferred embodiment according to this aspect of the present invention, the feedstock is capable of undergoing one or more competing chemical reactions in the reactor to produce the end product compounds and one or more of a plurality of byproduct compounds depending upon the energy and chemical flux distribution along the length of the reactor, and the plurality of devices for supplying energy or chemical flux to the side walls are positioned to distribute the energy or chemical flux along the length of the reactor unit so as to increase the yield of the one or more end product compounds and decrease the yield of the one or more byproduct compounds relative to the yield of the end product compounds and the byproduct compounds when the feedstock is reacted without the introduction of energy or chemical flux to the reactor side walls.

Preferred flow reactors in accordance with the present invention employ an adaptive feedback control system to determine, establish and maintain the optimum energy and chemical flux distribution along the length of the reactor that will optimize the property of the one or more end product compounds. Therefore, flow reactors in accordance with this aspect of the present invention will further include:

an adaptive feedback controller; and one or more devices for measuring a property of the one or more end product compounds produced in the reactor unit, and adapted to provide information to the controller on the end product property;

wherein the feedback controller is operative to employ an algorithm to conduct an iterative multi-variant analysis of the competing chemical reactions for a plurality of energy and chemical flux distributions to determine the energy and chemical flux distribution effective to optimize the end product property, in which the analysis is based on the end product property information provided to the controller by the end product property measuring devices.

The feedback controller is adapted to actuate the plurality of devices for supplying energy or chemical flux through the reactor unit side walls to establish the plurality of energy and chemical flux distributions to conduct the multi-variant analysis, and to establish and maintain the energy and chemical flux distribution determined by the iterative multi-variant analysis to optimize the end property. The plurality of devices for supplying energy or chemical flux through the reactor unit side walls are adapted to be actuated by the feedback controller to establish any one of a plurality of chemical and energy flux distributions along the length of the reactor selected by the controller.

The flow reactor preferably also includes a plurality of devices for determining the energy and chemical flux distribution along the length of the reactor unit, adapted to provide information to the controller on the energy and chemical flux distribution. The controller then also bases its iterative multi-variant analysis on the energy and chemical flux distribution information.

In a preferred embodiment of this aspect of the present invention, the iterative multi-variant analysis performed by the adaptive feedback controller includes the steps of:

(a) actuating the plurality of devices for supplying energy or chemical flux through the reactor unit side walls to establish an energy and chemical flux distribution along the length of the reactor unit;

(b) determining an end product property for the energy and chemical flux distribution based on information provided to the controller by the end product property measuring devices;

(c) accumulating the information on the end product property and the energy and chemical flux distribution corresponding thereto; and (d) repeating the actuating, determining and accumulating steps for different energy and chemical flux distributions.

Based upon the accumulated data, the adaptive feedback controller is able to select the energy and chemical flux distribution in which the end product property is optimized. The controller subsequently actuates the devices for supplying energy or chemical flux through the reactor unit side walls to establish along the length of the reactor unit the energy and chemical flux distribution for which the end product property is optimized.

Thus, it will be appreciated that an adaptive feedback control system in accordance with the present invention is capable of teaching itself through the iterative multi-variant analysis how to establish and maintain the optimum energy and chemical flux distribution along the length of the reactor for the production of end products as simple as a single chemical species or as complex as a mixture of higher compounds. For feedstocks that are capable of undergoing competing chemical reactions to produce a large number of potential end product and byproduct compounds, the feedback control system may be employed to establish and maintain the optimum energy and chemical flux distribution along the length of the reactor that will maximize the yield of a selected end product compound or mixture of compounds and at the same time minimize the total byproduct yield.

In one embodiment, the flow reactor of the present invention is a plug flow reactor that obtains a high degree of selectivity in the production of an end product from a feedstock capable of undergoing one or more competing chemical reactions in a reactor to produce the end product and one or more of a plurality of byproducts, depending upon the energy and chemical flux distribution along the length of the reactor.

The present invention thus makes it possible to adapt a flow reactor to produce an optimized end product compound or mixture of compounds from a given feedstock without having to perform extensive modeling of conditions within the reactor unit to arrive at a starting flux profile. Instead, initial settings may be determined by relatively simple modeling techniques that are then optimized through the use of the adaptive feedback control system.

The flow reactors of the present invention are not limited to use in traditional end-use applications such as the manipulation of chemical reactions. Instead, there are broader applications involving exactly the same key concepts, such as producing foodstuffs, which would represent the production of a mixture of end product compounds from a mixture of feedstock compounds. In this case, heat or chemicals, or other incomplete foodstuff materials, may be added in a distributive fashion along the length of the reactor, and adaptive feedback control would be employed to determine that distribution. The flow reactor may be a bioreactor, in which metabolites, enzymes, bacteria or other bioactive material may be fluxed in through the reactor side walls for control purposes. Fermentation or other biological processes would take place throughout the length of the reactor in a fully controlled fashion to obtain an optimized product yield or other property. The flow reactors of the present invention can also be employed to create particular tailored polymer products, by appropriate monomer, higher—mer, or energy control, along the length of the reactor unit. Thus, for purposes of the present invention, the term "chemical flux" is defined as including essentially any material supplied in a distributed fashion along the length of the reactor unit for reaction with a feedstock compound or compounds within the reactor unit.

Furthermore, the property to be measured and optimized at the end of the reactor unit need not be the yield of a particular chemical species. The actual desired product could be a complex mixture of compounds, with the goal being some particular overall composition of the mixture. Thus, the detection of the desired end product could include the measurement of species compositions, bulk properties and the like.

The present invention therefore also includes methods for providing a high degree of selectivity in the operation of a flow reactor having side walls defining an elongated reactor unit having a length dimension along which a feed stock is reacted under varying conditions of energy and chemical flux effective to produce one or more end product compounds. The method includes the steps of:

determining the energy and chemical flux distribution along the length of the reactor unit that will optimize a property of the one or more end product compounds; and supplying predetermined quantities of energy or chemical flux through the reactor unit side walls at a plurality of locations along the length of the reactor unit, wherein the locations and quantities are effective to establish and maintain the energy and chemical flux distribution that optimizes the property of the one or more end product compounds.

For feedstocks that are capable of undergoing one or more competing chemical reactions to produce one or more end product compounds and one or more of a plurality of byproduct compounds depending upon the energy and chemical flux distribution along the length of the reactor unit, a preferred method in accordance with the present invention determines the energy and chemical flux distribution along the length of the reactor unit that will maximize yield for one or more of the end product compounds and at the same time minimize the total byproduct yield. Predetermined quantities of energy or chemical flux are then supplied through the reactor unit side walls at a plurality of locations along the length of the reactor unit effective to establish and maintain the energy and chemical flux distribution that maximizes the yield of the one or more end product compounds and minimizes the total byproduct compound yield.

Another preferred method in accordance with the present invention employs an adaptive feedback control system using an algorithm to conduct an iterative multi-variant analysis for a plurality of energy and chemical flux distributions to determine the distribution that is effective to optimize the property of the one or more end product compounds. Accordingly, preferred methods of determining the optimizing energy and chemical flux distribution include the steps of:

(a) supplying energy or chemical flux through the reactor unit side walls to establish an energy and chemical flux distribution along the length of the reactor unit;

(b) determining an end product property for the established energy and chemical flux distribution;

(c) accumulating information on the end product property for each energy and chemical flux distribution; and (d) repeating the supplying, determining and accumulating steps for a plurality of energy and chemical flux distributions.

Plug flow reactors in accordance with the present invention in which energy or chemical flux is supplied through the reactor side walls along the length of the reactor unit, and which employ adaptive feedback control systems, make possible the conversion of methane to higher hydrocarbons, partial oxygenates or other bulk chemicals at yields heretofore unknown. Other features of the present invention will be pointed out in the following description and claims, which disclose the principles of the invention and the best modes which are presently contemplated for carrying them out.

BRIEF DESCRIPTION OF THE DRAWINGS

A more complete appreciation of the invention and many more other intended advantages can be readily obtained by reference to the detailed description of the invention when considered in connection with the following drawings, wherein.

It should be noted that the drawings are not necessarily to scale, but that certain elements have been expanded to show more clearly the various aspects of the present invention and their advantages.

DETAILED DESCRIPTION OF THE PREFERRED EMBODIMENT

The flow reactors of the present invention will initially be described with reference to plug flow reactors. However, the flow reactors of the present invention are not limited to reactors employing plug flow as the means of mass and energy transport within the reactor, but also include flow reactors that incorporate internal mixing and recirculation of mass and energy as well.

Figure 1:
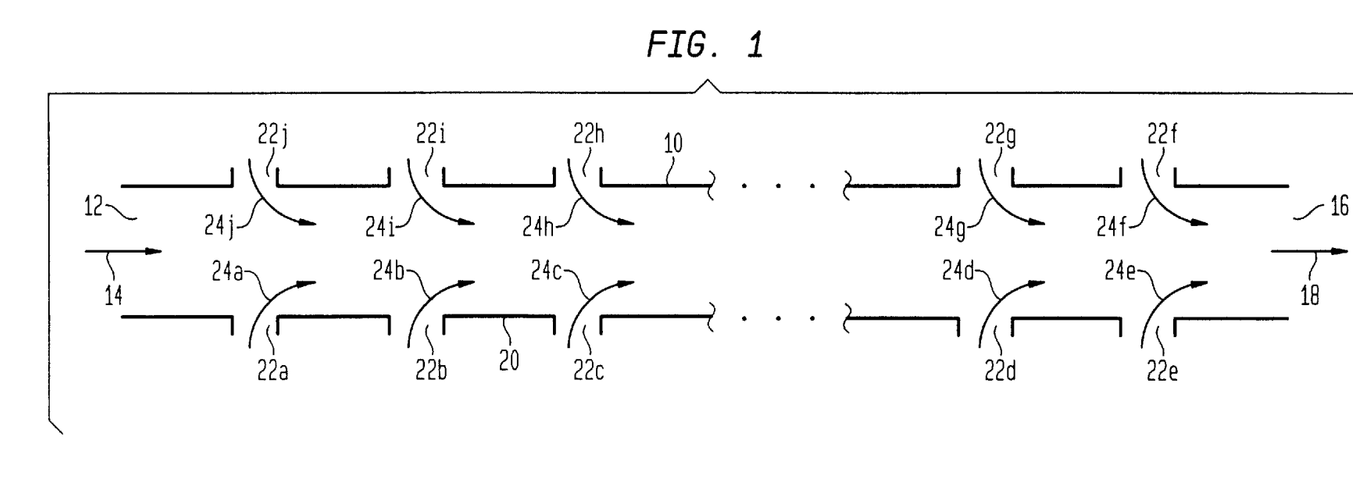
FIG. 1 shows a side, cross-sectional view of a plug flow reactor according to the present invention.

A plug flow reactor in accordance with the present invention is shown in FIG. 1 in which reactor unit 10 has an inlet 12 through which feedstock 14 is delivered. The feedstock may be a single chemical species or a mixture of compounds. The feedstock is reacted along the length of the reactor unit to form end product 18 which exits the reactor unit through outlet 16. The reactor unit 10 also has side wall 20 through which energy or chemical flux is supplied to react with the feedstock 18 to establish and maintain the energy and chemical flux distribution along the length of the reactor unit that maximizes end product yield while at the same time minimizing the total byproduct yield.

In the embodiment shown in FIG. 1, side wall 20 has input ports 22a, 22b, 22c, etc., through which chemical fluxes 24a, 24b, 24c, etc., are supplied and reacted with the feedstock 14 to produce the end product 18. Each port is in communication with a device supplying the chemical flux to the port (not shown). The device supplying the flux, in turn, is in communication with a microprocessor (not shown), which controls the reactor unit energy and chemical flux distribution to maximize the end product yield and at the same time to minimize the total byproduct yield.

The microprocessor receives information on end product and byproduct yield from measuring devices (not shown) positioned at outlet 16 of reactor unit 10 or, alternatively, within the reactor unit 10, slightly upstream of outlet 16. The microprocessor uses the yield information to adjust the supply of chemical flux to the input ports to establish and maintain the energy and chemical flux distribution along the length of the reactor unit that is effective to maximize end product yield and to minimize total byproduct yield.

In preferred embodiments of the present invention, the microprocessor functions as an adaptive feedback controller by using an algorithm to conduct an iterative multi-variant analysis of the competing chemical reactions that the feedstock may undergo under varying conditions of energy and chemical flux for a plurality of energy and chemical flux distributions to determine the flux distribution most effective to maximize end product yield and minimize total byproduct yield. Thus, the microprocessor will establish a series of energy and chemical flux distributions within the reactor unit by varying the amount of chemical flux supplied to the input ports. The end product and byproduct yields are measured for each flux distribution, the yield data are accumulated, and the microprocessor selects the flux distribution that is most effective in maximizing end product yield and minimizing byproduct yield. The microprocessor then actuates the devices supplying chemical flux to the input ports along the reactor unit side wall to establish and maintain the energy and chemical flux distribution that produces the greatest yield of end product with minimum total byproduct yield.

The microprocessor may also rely upon information on the energy and chemical flux distribution within the reactor unit provided by a plurality of devices for determining the flux distribution positioned along the length of the reactor unit (not shown) and adapted to provide flux distribution information to the microprocessor. Plug flow reactors in accordance with the present invention that are operated by adaptive feedback controller microprocessors are thus capable of learning for a given feedstock the optimum energy and chemical flux distribution for maximizing end product yield and minimizing byproduct yield and then establishing and maintaining the flux distribution along the length of the reactor. The adaptive feedback controller microprocessor is also capable of reacting to changes in the feedstock to maintain the maximum end product yield.

In the embodiment depicted in FIG. 1, the delivery of chemical flux through the side wall 20 of reactor unit 10 is shown. As an alternative, energy flux may be supplied instead in the form of heat or other radiative sources such as microwaves that are fluxed in a distributed fashion along the lengths of the reactor. The energy flux would not necessarily be supplied to input ports along the length of the reactor unit side wall, but may be radiated through the side wall, for example, by positioning sources of heat or microwave radiation along the reactor unit side wall exterior. The reactor unit may also employ porous side walls through which energy or chemical flux is delivered to the interior of the reactor unit.

It will thus be appreciated that when energy flux is supplied through the reactor unit side walls to establish and maintain the energy and chemical flux distribution along the length of the reactor unit, the yield information will be used by the microprocessor to adjust the supply of energy flux through the reactor unit side walls along the length of the reactor unit to establish and maintain the energy and chemical flux distribution that maximizes end product yield. Likewise, the iterative multi-variant analysis will be performed by the microprocessor by varying the amount of energy flux supplied through the reactor unit side walls to establish a series of energy and chemical flux distributions within the reactor unit. The delivery of energy flux through the reactor unit side walls will then be controlled by the microprocessor to establish and maintain the energy and chemical flux distribution selected by the microprocessor as producing the greatest yield of end product with minimum total byproduct yield.

The energy flux need not be used as an alternative to chemical flux, but rather may also be used in combination with the chemical flux. According to this embodiment of the invention, devices supplying chemical flux and sources of energy flux are positioned along the length of the reactor unit side wall. The microprocessor will then control the amount of energy and chemical flux supplied through the reactor unit side wall at various locations along the length of the reactor unit to establish and maintain the energy and chemical flux distribution producing the maximum end product yield and minimum total byproduct yield. When performing an iterative multi-variant analysis, the microprocessor will control the combination of energy and chemical flux being supplied through the reactor unit side walls to establish the series of energy and chemical flux distributions from which the microprocessor selects the distribution that is most effective in maximizing end product yield and minimizing total byproduct yield, which distribution is then established and maintained in the reactor unit.

Input ports 22a, 22b, 22c, etc., need not be individually limited to supplying a single flux through the reactor unit side wall. Significantly, many different energy and chemical fluxes can enter the reactor unit through the same port location.

The feedstock 14 supplied to the reactor unit 10 need not enter through the inlet 12, but instead may also be supplied through the reactor unit side walls at one or more of the input port locations 22a, 22b, 22c, etc., along the length of the reactor unit. The present invention includes plug flow reactors in which no feedstock is supplied through the inlet 12, and plug flow reactors in which all of the feedstock is supplied through the inlet 12. A reactor in which the feedstock is provided through both the inlet 12 and the inlet ports in the reactor unit side walls is also included as being within the scope of the present invention.

The present invention also includes plug flow reactors in which energy or chemical flux is delivered through the inlet 12 in addition to the energy or chemical flux that is supplied through the reactor unit side wall. The energy or chemical flux may be delivered through the inlet 12 with or without the feedstock. When it is delivered with the feedstock, the flux and feedstock may be delivered as a mixture, or sequentially, with the feedstock being delivered first followed by the energy or chemical flux, or the energy or chemical flux being delivered first followed by the feedstock. For example, a plug flow reactor may be constructed in which feedstock and chemical flux is delivered through the reactor unit inlet and energy flux is delivered through the reactor unit side walls.

In addition to controlling the energy and chemical flux distribution along the length of the reactor unit by supplying energy flux through the reactor unit side wall, the energy and chemical flux distribution may be controlled through the reactor unit side wall by withdrawing energy from the reactor through the side wall, i.e., by cooling a section of the reactor unit. Control of the energy and flux distribution may also be achieved by varying the cross-sectional area of the reactor unit, for example, with either a fixed or variable venturi segment, so as to alter the pressure or local residence time along a segment of the reactor unit. Control of the energy and chemical flux distribution may also be achieved by filling or lining either a portion of, or the entire reactor unit, with appropriate catalysts, which may vary in compositions along the length of the reactor unit.

The control of flux distribution along the length of the reactor unit may in certain circumstances be of a hybrid energy/chemical nature and achieved through the application of voltages by insulated electrodes inserted through the walls of the reactor unit into the material flowing through the reactor. Each electrode would have its voltage or current controlled through feedback, thereby providing an electro- or electrochemical flow reactor. Such a reactor would naturally have the capability for supplying chemical or energy flux simultaneously along the length of the reactor unit.

As noted above, the flow reactors of the present invention are not limited to plug flow reactors, but also include flow reactors that employ internal mixing and recirculation of the mass and energy flux distributed along the length of the reactor unit. Furthermore, the present invention is not limited to flow reactors and methods in which the energy and chemical flux is distributed along the length of the reactor unit to increase end product yield relative to potential byproducts. The flow reactors of the present invention also include reactors in which the energy and chemical flux is distributed along the length of the reactor unit to optimize a property of the one or more end products produced within the reactor unit.

Thus, the properties to be observed and optimized at the end of the reactor need not be just the yield of a particular chemical species. The actual desired end product can also be a complex mixture of compounds, with the goal being a particular overall composition of the mixture, for example, a foodstuff, consisting of many components appropriately balanced through chemical and physical manipulation in the reactor. In that case, the detection of the desired end products or byproducts could also include the measurement of species compositions, bulk properties, and the like. The desired end product properties to be measured may also be collective in nature, rather than focusing on a single property, such as yield, of a particular chemical or chemicals. Such properties may include, for example, one or more of molecular weight, viscosity, optical properties, magnetic properties, thermal properties, mechanical properties, elastic properties, electrical conductivity, and the like. For a mixture of end product compounds, the same property may be maximized for one compound and minimized for another compound. An appropriate well-known detection means is applied in each case.

Thus, the present invention includes flow reactors and methods in which one or more end product properties are optimized, while several others are minimized at the same time, which evidences the broad flexibility provided by the reactors of the present invention, attributable to the use of feedback control to balance such multi-variant applications.

Flow reactors are described that maximize end product yield and optimize other end product properties. For purposes of the present invention, an "optimum" property of an end product compound or compounds is defined as a value for a preselected property falling within a predetermined empirical range considered desirable for the end product compound or compounds for any number of a wide variety of reasons ranging, for example, from criticality to performance in a given end-use application, to consumer acceptance on the basis of appearance, to the lowering of costs associated with the use of the end product in subsequent manufacturing processes. Optimization may involve maximizing an end product property, minimizing an end product property or obtaining an end product property within an empirical range that is neither the maximum nor minimum value attainable for that property. Several properties may be simultaneously maximized, minimized and controlled within an intermediate range.

Figure 2:
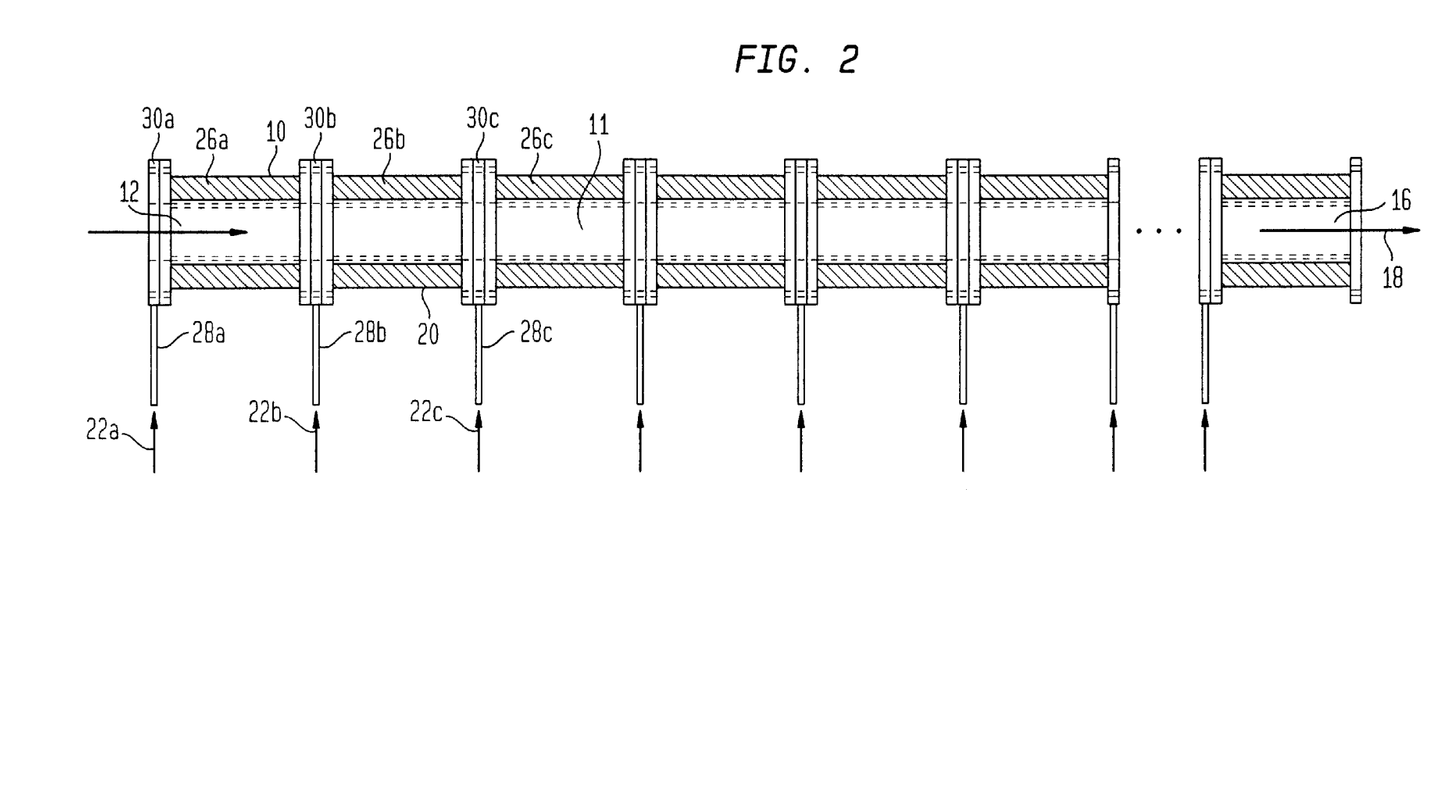
FIG. 2 shows a side, cross-sectional view of a plug flow reactor according to another embodiment of the present invention assembled from a plurality of modular units.

To accommodate the various means by which the energy and chemical flux distribution along the length of a reactor unit may be controlled, and to provide flexibility in reactor design, construction and operation, flow reactors in accordance with the present invention may be assembled from modular components. A plug flow reactor in accordance with this embodiment of the invention is shown in FIG. 2, in which modular units 26a, 26b, 26c, etc., are assembled to form reactor unit 10 having an inlet 12 through which feedstock 14 is delivered and reacted along the length of the reactor unit to form end product 18, which exits the reactor unit through outlet 16.

Between adjoining modular units, for example, 26a and 26b, 26b and 26c, etc., are input ports 30b, 30c, etc., respectively, through which energy or chemical flux is delivered to the interior 11 of the reactor unit to establish and maintain a variable energy and chemical flux distribution along the length of the reactor unit. Ducts 28b and 28c supply the energy or chemical flux to respective inlet ports 30b and 30c, respectively. Each duct is in communication with a device supplying the energy or chemical flux (not shown) which, in turn, is in communication with a microprocessor (not shown), which controls the energy and chemical flux distribution along the length of the reactor unit in the manner described above with respect to the embodiment depicted in FIG. 1. In particular, in the embodiment depicted in FIG. 2, the microprocessor will select quantities of energy or chemical flux to be delivered to inlet ports 30a, 30b, 30c, etc., which are effective to establish and maintain the flux distribution determined by the microprocessor to provide maximum end product yield and minimum total byproduct yield.

Figure 3A:
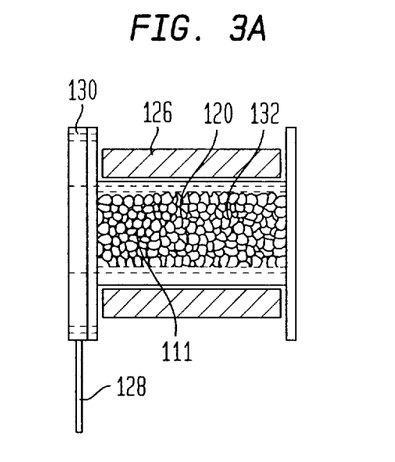
FIGS. 3A, 3B and 3C show side, cross-sectional views of individual modular units for the plug flow reactor embodiment of FIG. 2.
Figure 3B:
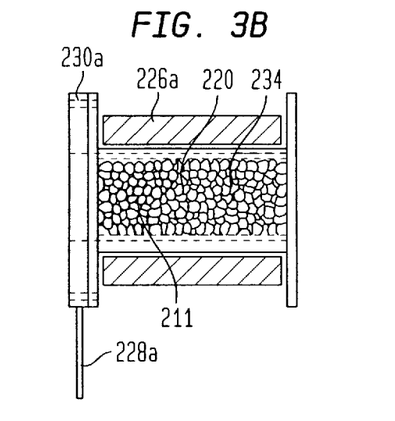
Figure 3C:
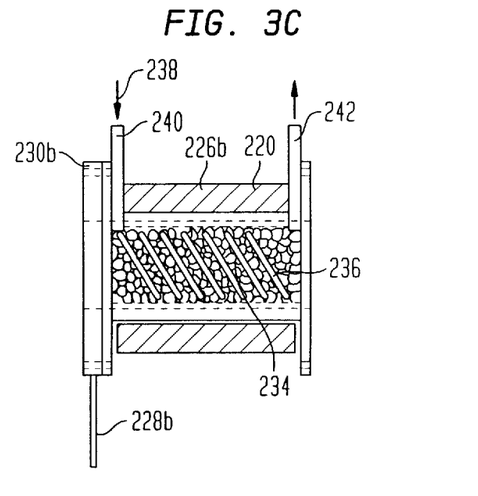

Examples of modular units in accordance with the present invention are shown in FIGS. 3A–3C. In FIG. 3A, modular unit 126 is filled with inert fixed bed 132 contacting side wall 120. Energy or chemical flux is supplied to modular unit 126 through inlet port 130 where it reacts with feedstock traveling through the inert fixed bed 132 in the interior 111 of the modular unit 126. Energy or chemical flux is supplied to the inlet port 130 through duct 128 from an energy or chemical flux source (not shown) under the control of a microprocessor (not shown).

Modular unit 226a shown in FIG. 3B has a fixed catalytic bed 234 in contact with the unit side wall 220. Duct 228a supplies energy or chemical flux from a flux source (not shown) to inlet port 230a, which delivers the flux to the interior 211 of unit 226a wherein it is reacted with the feedstock traveling therethrough. The delivery of flux to inlet port 230a is likewise controlled by a microprocessor (not shown).

Modular unit 226b of FIG. 3C with a fixed catalytic bed 234 in contact with side wall 220 is similar to modular units 226a shown in FIG. 3B, but further includes cooling coil 236 through which a cooling fluid 238, such as water, circulates, entering inlet 240 and exiting outlet 242. The circulation of cooling fluid 238 is also controlled by the microprocessor (not shown). The cooling coil thus withdraws energy from this segment of the reactor unit. Typically, under such circumstances, the flux provided to the inlet port is a chemical flux.

Figure 4:
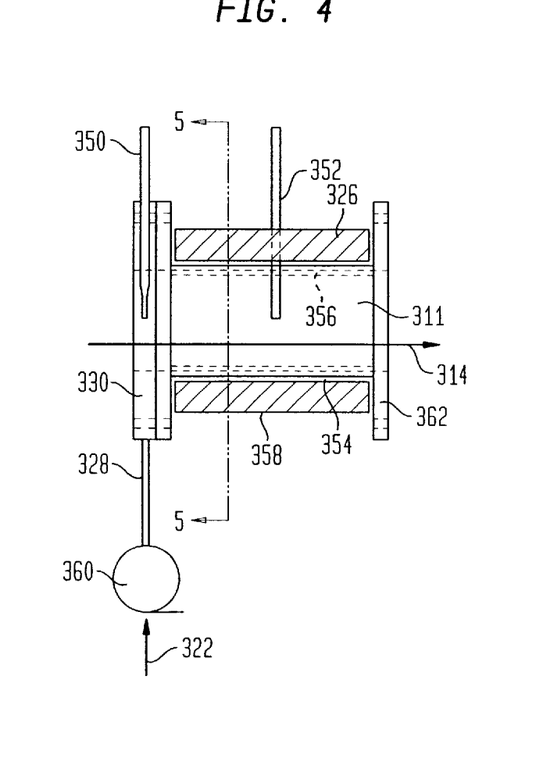
FIG. 4 is a side, cross-sectional view of another individual modular unit for the plug flow reactor embodiment of FIG. 2.

FIG. 4 depicts a modular unit 326 employing devices for determining the energy flux distribution along the length of the reactor unit, i.e., thermocouples 350 and 352. Thermocouple 350 measures the temperature of energy or chemical flux 322 supplied to the interior 311 of modular units 326 by input port 330, wherein it reacts with feedstock 314 as it flows through the modular units. Thermocouple 352 is positioned to measure the temperature of the interior of modular units 326. The modular units consist of an interior tube 354 with quartz lining 356, surrounded by a controllable heat source 358. Inconel flange 362 maintains a seal between modular units 326 and the adjoining modular units.

In the modular units depicted in FIG. 4, chemical flux 322 is delivered to input port 330 by duct 328 by mass flow controller 360 from the chemical flux source (not shown). The heater 358 and mass flow controller 360 are controlled by the microprocessor (not shown) to control the energy and chemical flux distribution along the length of the reactor unit based on information received on end product and total byproduct yields, as well as information received from the thermocouples 350 and 352, to establish and maintain the flux distribution selected by the microprocessor following an iterative multi-variant analysis as maximizing end product yield and minimizing total byproduct yield.

FIG. 4 represents but one non-limiting example of a modular reactor unit. The thermocouples, quartz lining and inconel flange are intended to illustrate, but not to limit, the examples of reactor unit components. Other means of measuring temperature, lining the reactor, and flange materials, may be exploited. The choices will depend on the operating conditions and the purpose of the reactor, and can be readily made by one of ordinary skill in the art without undue experimentation.

Figure 5:
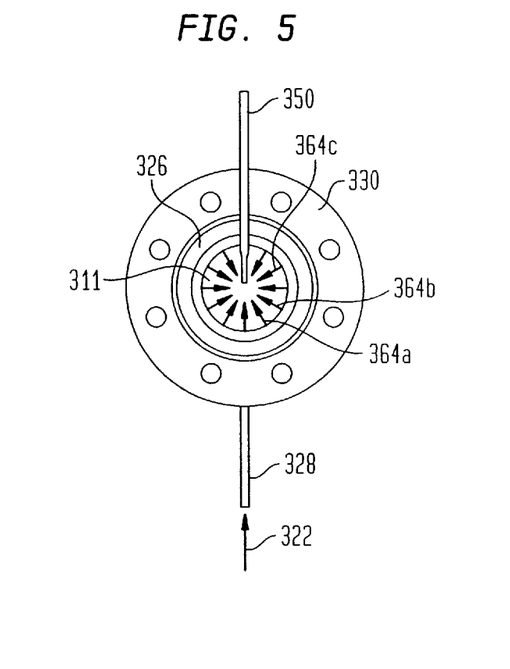
FIG. 5 is a front view of the modular units depicted in FIG. 4.

Input port 330 is shown in greater detail in FIG. 5, which is a front view of the modular units of FIG. 4 along lines 5—5. FIG. 5 depicts an inlet port 330 to which chemical flux 332 is supplied by duct 328. The interior of inlet port 330 has multiple injection points 364a, 364b and 364c through which the chemical flux is injected into the modular units interior 311 for reaction with the feedstock passing therethrough.

Flow reactors assembled from multiple modular units in accordance with the present invention thus can be readily reconfigured to change over the reactor to the preparation of a different end product from a different feedstock. By utilizing adaptive feedback control, however, it is not always necessary to reconfigure the reactor to obtain a different end product from a given feedstock. Accordingly, for purposes of the present invention "end product" is defined as being the desired object product to be obtained from a feedstock on a given run of the reactor. "Byproducts" are defined as the products of competing side reactions that the feedstock also undergoes that are undesired for the same given run.

Thus, a reactor with a first energy and chemical flux distribution may produce from a given feedstock a first chemical as the desired end product and minimize the yield of a second chemical as the undesired byproduct. A second energy and chemical flux distribution may be established in the same reactor for the same feedstock and produce high yields of the second chemical as the desired end product and minimize the yield of the first chemical as the undesired byproduct.

Adaptive feedback control may be utilized to accomplish this with the use of a feedback controller such as a microprocessor that is programmed to execute an algorithm to conduct an iterative multi-variant analysis of the competing chemical reactions for a given feedstock, desired object end product, and undesired byproducts for a plurality of energy and chemical flux distributions established in the reactor unit. By means of the executed algorithm, the microprocessor establishes a series of energy and chemical flux distributions and selects the distribution producing the highest yield of the given object end product and lowest yield of the undesired byproduct. The algorithm will utilize information received from the reactor on end product and byproduct yield. The algorithm may also optionally utilize information received from the reactor on the energy and chemical flux distribution within the reactor when establishing a given flux distribution within the reactor.

Thus, the plug flow reactor embodiments depicted in FIGS. 1 and 2 will employ one or more devices for measuring end product and byproduct yield (not shown), which devices will then provide information on the measured yields to the microprocessor. The yields may be measured after the end product and byproducts exit the reactor unit outlet, or the measurement may occur slightly upstream of the outlet.

Typical devices for measuring products and byproducts include well-known in situ and extractive means, such as gas/liquid chromatography, general spectroscopic techniques, and the observation of bulk sample properties (e.g., viscosity, electromagnetic properties, and the like).

The plug flow reactor embodiments depicted in FIGS. 1 and 2 will also employ one or more devices (not shown) for supplying energy or chemical flux through the reactor unit side walls to establish along the length of the reactor unit the energy and chemical flux distribution for which end product yield is maximized. The devices for supplying energy or chemical flux to the reactor unit side walls may be actuated and controlled by the microprocessor (not shown) to provide predetermined quantities of energy or chemical flux at selected locations to establish and maintain an energy and chemical flux distribution along the length of the reactor. Examples of chemical flux supplying devices include the mass flow controller 360 shown in FIG. 4. Other well-known suitable chemical flux sources include local on-site port preparation of desired fluxed species, by various conventional means, including electrical discharges, laser excitation, microwave processing, and the like. Energy flux supplying devices include the heater 358 shown in FIG. 4. Other suitable well-known energy sources include microwave generators, lasers, plasma generators, chemical agents, and the like.

However, it is not critical that reactors of the present invention, or the method of the present invention performed therein, determine both the input fluxes being supplied to the reactor and the state of the reactor as it relates to flux distribution (i.e., the chemical, physical and thermal state at any point in the reactor). In some applications, it may not be necessary to measure both of these classes of quantities. The method and flow reactors of the present invention are uniquely flexible and may be operated in a mode wherein only the input fluxes are being determined, only the state of the reactor is being determined, or both the input fluxes and state of the reactor are being determined.

In many applications, it will be sufficient to merely require that the flux control units be systematic and reliable in their performance, instead of having knowledge of their absolute calibration. That is, it will often be sufficient to only know that a particular setting on the control flux is repetitive in its reliability, rather than its absolute value. The feedback controller can operate without the latter extra absolute information for those applications in which it is exceedingly difficult to determine absolute chemical or biological fluxes, which, in most circumstances, are unnecessary for reactor optimization.

Furthermore, the plug flow reactor embodiments depicted in FIGS. 1 and 2 may optionally employ a plurality of devices for determining the energy and chemical flux distribution along the length of the reactor unit (not shown), which devices will then provide information on the energy and chemical flux distribution to the microprocessor. An example of one device is shown in FIGS. 4 and 5, in which a thermocouple 352 is positioned to measure the temperature within a modular subunit, which represents information on the energy flux distribution within the reactor unit. The energy flux distribution along the lengths of the reactor unit may also be determined by measuring the energy being supplied by heat sources, such as heater 358 in FIG. 4, which can be as simple as measuring the heat supply level at which the heater is set. This is an example of how the energy flux distribution within the reactor can be determined externally. Likewise, the chemical flux distribution can be measured by determining the quantity of chemical flux being supplied at predetermined locations along the length of the reactor unit. Other devices for determining energy and chemical flux distribution within a reactor subunit include the aforementioned devices for measuring products and byproducts in situ.

A wide variety of types of algorithms are available to provide adaptive feedback control of the flow reactors of the present invention. Examples of the types of algorithms that may be used include gradient-based algorithms, genetic algorithms, model-predictive algorithms, simulated annealing, and the like. As will be understood by one of ordinary skill in the art, specific algorithms may be written that are tailored to the characteristics of a given reactor, feedstock, competing reactions, and potential end products and byproducts. However, such algorithm variations can be readily devised by the ordinarily skilled artisan without undue experimentation.

Thus, adaptive feedback control is utilized in the method of the present invention to determine the energy and chemical flux distribution along the length of the reactor unit that will optimize a particular end product property, such as yield, and then to supply predetermined quantities of energy or chemical flux through the reactor unit side walls at a plurality of locations along the length of the reactor unit. The locations and quantities are selected by means of the adaptive feedback control to establish and maintain the energy and chemical flux distribution that optimizes end product property. The adaptive feedback control method supplies energy or chemical flux through the reactor unit side walls to establish an energy and chemical flux distribution along the length of the reactor unit, determines the end product property for the established energy and chemical flux distributions, accumulates information on the end product property for each energy and chemical flux distribution, and repeats the supplying, determining and accumulating steps for a plurality of energy and chemical flux distributions.

Once the method has been repeated for a sufficient number of multi-variant iterations, the adaptive feedback control method then selects the energy and material (e.g., chemical) flux distribution that optimizes the end product property and establishes and maintains the selected energy and material flux distribution by supplying energy or material fluxes through the reactor unit side wall at a plurality of locations that, from the accumulated information, corresponds to the selected energy and material flux distribution.

It is through this adaptive feedback method that the control system effectively teaches itself how to run the reactor for a given feedstock to obtain a selected end product at maximum yield while at the same time minimizing the yields of undesired byproducts. The significant advantage of such a control system is that it eliminates the need for extensive modeling of the reactor system for a given feedstock to determine the optimum flux distribution that maximizes the selected end product yield.

Extensive computer modeling has been employed to determine the optimum heat, oxygen and chlorine flux distributions in a plug flow reactor for the chlorine-catalyzed oxidative pyrolysis process for the conversion of methane to ethylene. The computer model assumed a reactor length of 100 cm, a cross-sectional area of 40 $cm^2$, an initial flow rate of 1 g/s and a constant pressure of 1 atm.

It was determined that the conversion of methane to ethylene was a two-step process in which the methane was first consumed by being converted to ethylene. Because ethylene is more reactive than methane under the conditions in the reactor that convert methane to ethylene, the reaction does not stop upon conversion of methane to ethylene. As the ethylene concentration within the reactor increases, the ethylene, in turn, is converted to acetylene. The computer determined the optimum flux distribution for heat, oxygen and chlorine fluxes, as well as for heat and oxygen fluxes alone, and heat flux alone, that would result in the reconversion of acetylene to ethylene in the second stage of the reaction by generating hydrogen atoms from the molecular hydrogen produced from the conversion of methane to ethylene, which hydrogen atoms are added across the acetylene bond to yield ethylene with acetylene as a minor product. The computer model also determined the optimum heat flux distribution that would minimize reconversion of acetylene back to ethylene and instead yield acetylene with ethylene as a minor byproduct.

While the extensive computer modeling illustrates that it is possible to convert methane at high efficiency to either ethylene or acetylene, until now, this was not possible in practice because the ideal system employed by the computer model cannot be duplicated under operating conditions. The modeled reactions, however, can be performed in the flow reactors of the present invention, despite the fact that such reactors not only are non-adiabatic because of the energy flux addition through the reactor unit side walls, but also fail to conform to the other idealized kinetic conditions assumed by typical computer models.

The adaptive feedback control systems of the present invention respond to changes in end product yield resulting in the deviation from idealized conditions to establish the energy and chemical flux distribution that will actually produce the maximum end product yield for a given feedstock. In a similar manner, the adaptive feedback control system also responds to variations in feedstock that would otherwise produce a reduction in end product yield to tailor the energy and chemical flux distribution to the feedstock deviation to restore end product yield.

As will now be readily appreciated, the flow reactors of the present invention employing adaptive feedback control systems make feasible the conversion of methane to industrially-useful hydrocarbons, partially oxygenated hydrocarbons and other useful chemical products of commercially viable high product yields. The reactors of the present invention also have broad-scale application to other gas and liquid phase chemical reactions, as well as to the chemical and pollution abatement fields, wherein a noxious gas or liquid input stream can be reacted with energy and chemical flux introduced through the reactor side wall to yield otherwise safe and potentially useful products at the outlet end of the reactor.

The foregoing description of the preferred embodiment should be taken as illustrating, rather than as limiting, the present invention as defined by the claims. Numerous variations and combinations of the features described above can be utilized without parting from the present invention.

What is claimed is:

1. A flow reactor providing a high degree of selectivity in the reaction of a feed stock to produce one or more end product compounds, comprising:

sidewalls defining an elongated reactor unit having a length dimension along which said feedstock is reacted under varying conditions of energy and chemical flux effective to produce said one or more end product compounds;

a plurality of devices supplying energy flux through said sidewalls to alter the distribution of said energy and chemical flux along the length of said reactor unit;

an adaptive feedback controller employing an algorithm to conduct an iterative multi-variant analysis for a plurality of energy and chemical flux distributions to determine the energy and chemical flux distribution effective to optimize said end product property, in which said analysis is based on end product property information provided to said controller; and one or more devices measuring a property of said one or more end product compounds produced in said reactor unit, and providing information to said controller on said end product property;

wherein said plurality of devices supplying energy flux through said sidewalls are actuated by said feedback controller to establish and maintain one of a plurality of chemical and energy flux distributions along said length of said reactor unit determined by said analysis to optimize said end product property.

2. The flow reactor of claim 1, wherein at least one of said devices supplying energy flux is a source of radiant energy.

3. The flow reactor of claim 2, wherein said radiant energy is heat or microwave radiation.

4. The flow reactor of claim 1, further comprising a plurality of devices for supplying chemical flux through said sidewalls.

5. The flow reactor of claim 1, comprising an inlet through which said feedstock is supplied to said reactor unit.

6. The flow reactor of claim 5, wherein said inlet also supplies energy or chemical flux to said reactor unit with said feedstock.

7. The flow reactor of claim 6, wherein said inlet supplies chemical flux to said reactor unit along with said feedstock.

8. The flow reactor of claim 1, comprising an inlet through which energy or chemical flux is supplied to said reactor unit.

9. The flow reactor of claim 8, further comprising at least one device supplying said feedstock through said side walls.

10. The flow reactor of claim 1, further comprising at least one device supplying said feedstock through said side walls.

11. The flow reactor of claim 1, wherein said flow reactor is a plug flow reactor.

12. The flow reactor of claim 1, wherein said feedstock undergoes one or more competing chemical reactions in said reactor to produce said one or more end product compounds and one or more of a plurality of byproducts depending upon the energy and chemical flux distribution along the length of said reactor, and said feedback controller actuates said plurality of devices supplying energy flux through said sidewalls to establish and maintain a distribution of energy and chemical flux that optimizes the yield of at least one of said end product compounds relative to the yield of said one or more byproduct compounds.

13. The flow reactor of claim 1, wherein said feedback controller actuates said plurality of devices supplying energy flux through said sidewalls to establish and maintain a distribution of energy and chemical flux that optimizes a plurality of properties of said one or more end product compounds, and said one or more devices measuring a property of said one or more end product compounds comprises a plurality of devices measuring a plurality of properties of said one or more end product compounds.

14. The flow reactor of claim 13, wherein said plurality of devices measuring a plurality of properties include a plurality of devices for measuring at least one of yield, molecular weight, viscosity, optical properties, magnetic properties, thermal properties, mechanical properties, elastic properties or electrical conductivity for said one or more end product compounds.

15. The flow reactor of claim 1, wherein said plurality of devices supplying energy or chemical flux through said sidewalls include electrodes inserted through said sidewalls into the material flowing through the reactor.

16. The flow reactor of claim 1, further comprising a plurality of devices determining the energy and chemical flux distribution along the length of the reactor unit and providing information to said controller thereon, wherein said controller also bases said iterative multi-variant analysis on said energy and chemical flux distribution information.

17. The flow reactor of claim 1, wherein said algorithm performing said iterative multi-variant analysis comprises the steps of:
(a) actuating said plurality of devices supplying energy flux through said sidewalls to establish said energy and chemical flux distribution along said length of said reactor unit;
(b) determining a property for an end product compound produced by said energy and chemical flux distribution based on information provided to said controller by said end product property measuring devices;
(c) accumulating information on said end product property determination and said energy and chemical flux distribution corresponding thereto; and
(d) repeating said actuating, determining and accumulating steps for different energy and chemical flux distributions.

18. The flow reactor of claim 17, wherein said algorithm conducting said interative multi-variant analysis further includes the steps of:

selecting an optimum end product property from said information accumulated on said end product property after said end product property information has been accumulated; and identifying the energy and chemical flux distribution corresponding to said optimum end product property.

19. The flow reactor of claim 18, wherein said algorithm conducting said interative multi-variant analysis further includes the step of actuating said devices supplying energy flux through said sidewalls to establish along the length of said reactor unit said energy and chemical flux distribution corresponding to said optimum end product property after said optimum end property is selected and said energy and chemical flux distribution corresponding thereto is identified.

20. The flow reactor of claim 1, further comprising an outlet through which said one or more end product compounds exit, wherein said one or more devices measuring a property of said one or more end product compounds measure said property downstream of said outlet.

21. The flow reactor of claim 1, further comprising an outlet through which said one or more end product compounds exit, wherein said one or more devices measuring a property of said one or more end product compounds measure said property upstream of said outlet.

22. The flow reactor of claim 1, further comprising a device cooling a segment of said reactor unit by withdrawing heat through said sidewalls actuated by said adaptive feedback controller to control said energy and chemical flux distribution along the length of said reactor unit.

23. The flow reactor of claim 1, further comprising a device varying the cross-sectional area of said reactor unit with a fixed or variable venturi segment actuated by said adaptive feedback controller to control said energy and chemical flux distribution along the length of said reactor unit.

24. The flow reactor of claim 1, wherein at least a portion of said reactor unit is lined or filled with a catalyst.

25. The flow reactor of claim 24, wherein the entire length of said reactor unit is lined or filled with a catalyst.

26. The flow reactor of claim 24, wherein said catalyst varies in composition along the length of said reactor unit.

27. The flow reactor of claim 1, wherein said reactor unit comprises a plurality of modular subunits.

28. The flow reactor of claim 27, wherein each modular subunit is in communication with an inlet port through which energy or chemical flux is delivered through said side walls.

29. The flow reactor of claim 27, wherein at least one modular subunit is lined or filled with an inert or catalytic fixed bed.

30. The flow reactor of claim 1, wherein said devices supplying energy flux, said devices measuring a property of said one or more end product compounds, said adaptive feedback controller and said algorithm are adapted for use with a feedstock comprising a plurality of food stuff components.

31. A flow reactor providing a high degree of selectivity in the production of an end product from a feedstock, said feedstock undergoing one or more competing chemical reactions in said reactor to produce said end product and one or more of a plurality of byproducts depending upon the energy and chemical flux distribution along the length of said reactor, said flow reactor comprising:

sidewalls defining an elongated reactor unit having a length dimension along which said feedstock is reacted under varying conditions of energy and chemical flux effective to produce said end product;

a plurality of devices supplying energy flux through said sidewalls to alter the distribution of said energy and chemical flux along said length of said reactor unit;

an adaptive feedback controller; and one or more devices measuring the yield of said end product compound in said reactor unit, and providing yield information to said controller; and wherein said feedback controller employs an algorithm to conduct an iterative multi-variant analysis for a plurality of energy and chemical flux distributions to determine the energy and chemical flux distribution effective to optimize the yield of said end product relative to the yield of said one or more byproducts, wherein said analysis is based on said yield information provided to said controller by said yield measuring devices; and said feedback controller actuates at least one device supplying energy flux through said sidewalls to establish and maintain said chemical and energy flux distribution determined by said analysis to optimize end product yield.

* * * * *